United States Patent [19]

Cross et al.

[11] Patent Number: 4,807,544
[45] Date of Patent: Feb. 28, 1989

[54] APPARATUS AND METHOD FOR SUBSURFACE INJECTION OF AGROCHEMICALS

[75] Inventors: Hewis W. Cross; James C. Lewis, both of Albany, Ga.

[73] Assignee: Cross Equipment Company, Inc., Albany, Ga.

[21] Appl. No.: 99,217

[22] Filed: Sep. 21, 1987

[51] Int. Cl.⁴ .............................................. A01C 23/02
[52] U.S. Cl. ............................................ 111/7; 47/1.7
[58] Field of Search ................. 47/1.5, 1.7; 111/1, 111/6, 7; 172/624, 500, 705, 710; 239/99, 103, 161, 163, 172, 176, 288, 288.3, 288.5

[56] References Cited

U.S. PATENT DOCUMENTS

| | | | |
|---|---|---|---|
| 3,012,526 | 12/1961 | Baldwin et al. | 111/6 |
| 3,252,249 | 5/1966 | Propst | 47/1.43 |
| 3,435,785 | 4/1969 | Hurbolt | 111/6 |
| 3,521,819 | 7/1970 | Johnston | 239/99 |
| 3,598,323 | 8/1971 | Johnston | 239/99 X |
| 3,815,525 | 11/1974 | Kainson et al. | 111/6 |
| 3,875,876 | 4/1975 | Pustovoit et al. | 111/1 |
| 3,921,159 | 11/1975 | Steffen | 340/267 R |
| 4,009,666 | 1/1977 | Russell et al. | 111/6 |
| 4,074,858 | 2/1978 | Burns et al. | 239/172 |
| 4,267,971 | 5/1981 | Johnston | 239/172 X |
| 4,358,054 | 11/1982 | Ehrat | 239/172 X |
| 4,481,894 | 11/1984 | Brenn | 111/6 |
| 4,518,118 | 5/1985 | Takata | 239/172 X |
| 4,624,193 | 11/1986 | Johnston | 111/6 |

*Primary Examiner*—Brian S. Steinberger
*Attorney, Agent, or Firm*—Fred K. Carr

[57] ABSTRACT

This invention relates to a method and apparatus for injecting agrochemicals into the subsurface of the soil without tilling of the soil. A high pressure pump delivers the solution to be injected to a series of injection nozzles. The injection nozzles cause liquid jets to be formed which have sufficient velocity and narrow cross-section to inject into the soil. The injection nozzles are supported by a shield-pan which rides on the surface of the soil. The apparatus causes continuous injection from a plurality of nozzles. The shield-pan minimizes clogging of the nozzles. In the preferred embodiment, a second low pressure system is incorporated to broadcast spray the soil surface. This is a low-pressure system utilizing a boom with broadcast nozzles.

23 Claims, 10 Drawing Sheets

APPARATUS AND METHOD FOR SUBSURFACE INJECTION OF AGROCHEMICALS

FIELD OF THE INVENTION

This invention relates to a spray apparatus for applying agrochemicals and more particularly, to an apparatus having dual spray systems, a high pressure spray system for injecting chemicals into the subsurface without tilling the soil, and a low pressure spray system for broadcasting chemicals on the surface of the soil. More especially it relates to an apparatus and method for injecting agromaterials utilizing high velocity liquid jets which penetrate to agronomical depth.

BACKGROUND OF THE INVENTION

With certain agricultural practices, the usual prior art method of applying chemicals such as fertilizer, herbicides, pesticides, fungicides, growth retardants, and related chemicals involves surface application of liquid or solid material. Surface application of material ultimately targeted for subsurface structures is inefficient because of physical forces acting on the material after it has been applied but before it has soaked or percolated to the target root structures. These physical forces include wind and air current drift, surface water induced runoff, ultraviolet breakdown of the agrochemical, and impenetrable soil surface. Surface application of material ultimately targeted for subsurface structures can have negative effects on the environment due to residue surface accumulation of chemicals and subsequent contamination of surface water due to runoff.

There are certain situations where it is possible to till the soil and to apply the agrochemical into the subsurface at the till. In many situations this is not desirable such as in no-till farming, or in maintenance of pastures, golf courses, parks, right-of-ways, and related areas. Various attempts at using a narrow chisel plow or knife to make a slit in the soil and applying the chemical in the narrow slit have proved impractical. Common problems encountered have been difficulty in keeping the chisel in the ground in hard soil, and excessive wear of the chisels.

Other attempts have been directed toward jet injection of chemicals into the soil. Among these are a proposal disclosed in U.S. Pat. No. 4,624,193. This disclosure utilized the power take-off of a tractor to power a pump where the entire pump output was directed to a single nozzle at a time. This disclosure lacked the ability for continuous injection from a plurality of nozzles. The presently disclosed invention utilizes a separate motor to power a high pressure piston pump sufficient to generate liquid jets which are continuous and from a plurality of nozzles.

Attempts at jet injection have been complicated by clogged nozzles. This problem is circumvented in the present disclosure by using an anti-fouling shield pan which rides on the surface and has orifices through which the liquid jets pass. These shield pans keep the injection nozzles close to the ground without exposure to debris.

SUMMARY OF THE INVENTION

In summary, this invention is directed to a system for independent or simultaneous surface application and subsurface soil injection of agrochemicals, attachable to a mobile unit. It includes a frame, chemical tank, high-pressure pump, low-pressure pump, hoses, pressure gauges and regulators, nozzles and nozzle shields, hydraulic cylinders, and means for powering the pumps.

The invention is accomplished by the use of a piston pump capable of generating high pressures of the solution to be injected. The pump delivers the mixture at high pressure into a manifold which distributes the solution to injection nozzle assemblies. The nozzles have tip sizes such that the solution forms liquid jets with sufficient velocity and narrow cross-section to penetrate into the subsurface. The capacity of the pump is such that there is continuous injection from a plurality of nozzles.

The primary object of this invention is to provide a subsurface soil injection system for agrochemicals.

Another object of this invention is to provide a surface spray system capable of independent or simultaneous application of chemicals with a subsurface soil injection system.

A further object of this invention is to provide an apparatus capable of minimizing surface runoff of applied agrochemicals.

A further object of this invention is to provide an apparatus capable of minimizing ultraviolet breakdown of applied agrochemicals.

A further object of this invention is to provide an apparatus capable of minimizing wind drift of applied agrochemicals.

A further object of this invention is provide an apparatus capable of minimizing evaporative loss of applied agrochemicals.

A further object of this invention is to provide an apparatus capable of enhancing penetration of agrochemicals into the soil.

A further object of this invention is to provide on apparatus capable of reducing surface residue of agrochemicals or breakdown products.

A further object of this invention is to provide an apparatus capable of reducing total chemical application because of increased efficiencies in application.

BRIEF DESCRIPTION OF THE DRAWINGS

Other objects of this invention will appear in the following description and claims, reference being made to the accompanying drawings which form a part of the specification.

DETAILED DESCRIPTION OF THE INVENTION

This invention relates to a spray apparatus having dual pressure spray systems for the application of agromaterials. The high pressure system is designed to inject agromaterials into the soil by high pressure, high velocity liquid jets without appreciable disturbance of the soil, that is, without utilizing plows, knives, etc. The low pressure system is designed for broadcasting spraying the surface of the soil with agrochemical. The two systems operate independent of each other, and are capable of independent or simultaneous application. This embodiment discloses a sprayer with dual pressure spray systems, however, the same principles would apply to a single high pressure delivery spray system without the low pressure delivery spray system.

Figure 1:
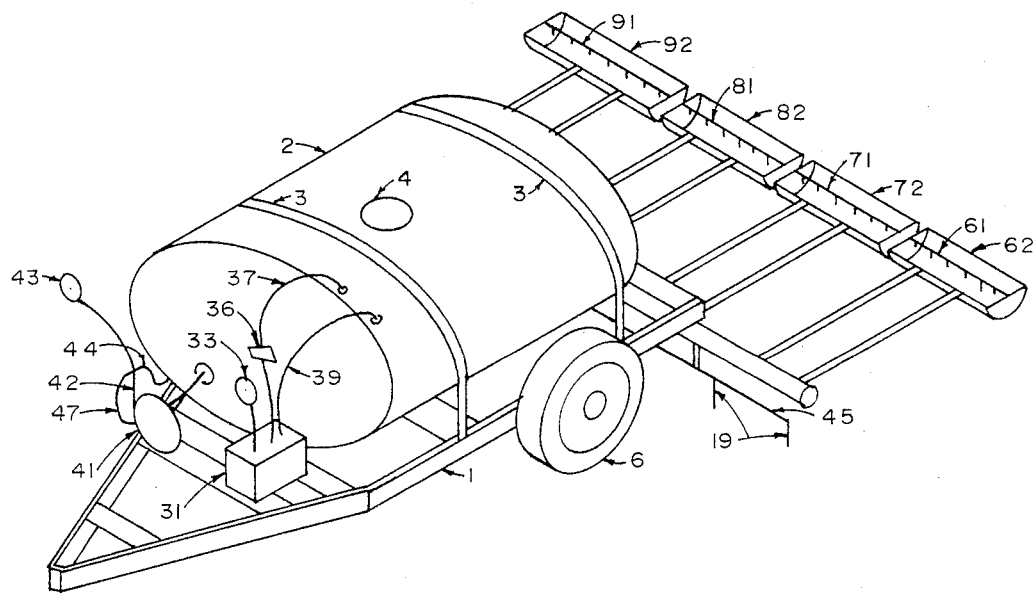
FIG. 1 is a perspective side view of the sprayer with high pressure injection system and low pressure broadcast system.

As seen in FIG. 1, the apparatus is mounted on a field sprayer vehicle having frame (1) with wheels (6), and can be towed by a form tractor (not shown). The sprayer generally includes a chemical tank, a high pressure piston pump, a low pressure pump, high pressure chemical (HPC) hoses, pressure gauges and regulators, broadcast and jet injection nozzles, shield pans, and engines for powering the pumps. Chemical tank (2) is supported by and attached to frame (1) by straps (3). Chemical tank (2) has a fill port (4) to receive water and chemicals to be applied. A commercially available agitation system (not shown) is incorporated in the tank to maintain adequate mixture of chemicals. The solution is withdrawn from chemical tank (2) by a high pressure piston pump (31) and delivered to injector nozzle assemblies (61), (71), (81), (91) for subsurface injection. Simultaneously or independently, solution is withdrawn by a low pressure pump (41) and delivered to mist nozzle assembly (45) for broadcast spraying the surface of the soil.

Figure 2:
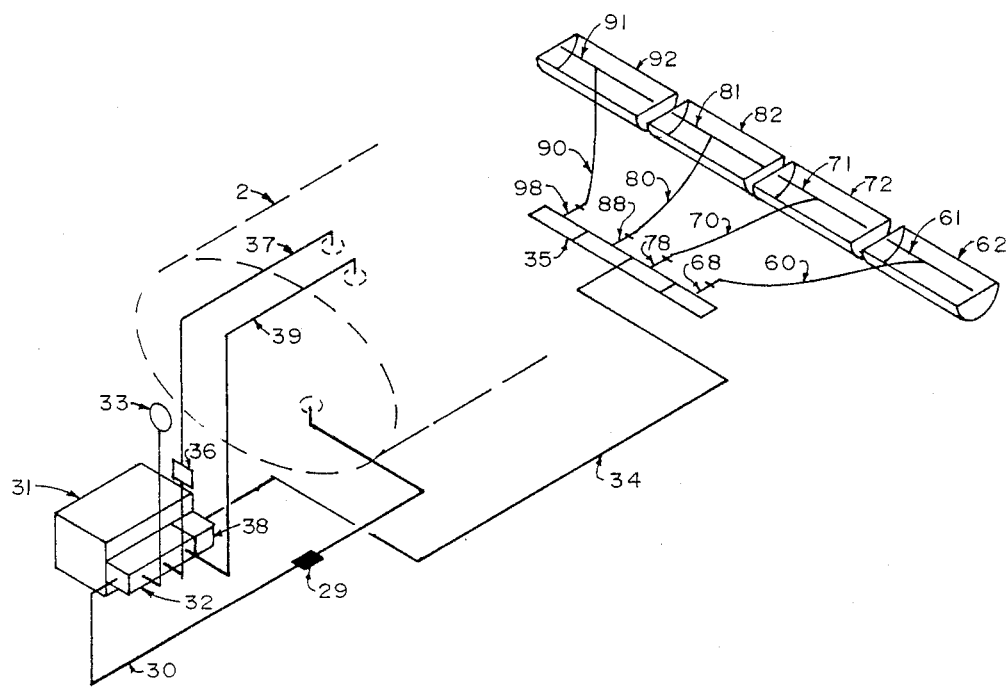
FIG. 2 is a schematic diagram of the plumbing for the high pressure injection system.

FIG. 2 is a schematic diagram of the plumbing of the high pressure injection system. HPC hose (30) connects high pressure pump (31) to chemical tank (2), having filter (29) to remove any particulate matter from the solution. Pump (31) delivers the solution at a high pressure into HPC hose (32) which connects to in-line electric bypass valve (36), and further connects to valve (38). From emergency bypass valve (38) the solution flows into HPC hose (34) which connects to distribution manifold (35). HPC hoses (60), (70), (80), (90) connect manifold (35) to injector nozzle assemblies (61), (71), (81), (91), respectively, through which the solution is delivered at high pressure. Injector nozzle assemblies (61), (71), (81), (91) are supported by and attached to injector shield pans (62), (72), (82), (92), respectively. In this embodiment, there are shown four individual shield pan assemblies, but there could be more or less in other embodiments.

Further reference to FIG. 2 shows the control valves for the high pressure injection system. In-line electric bypass valve (36) is connected to pump (31) by chemical hose (32). In one position, bypass valve (36) feeds the mixture back into tank (2) by chemical hose (37). In the alternate position, it feeds the mixture to manifold (35) through HPC hose (34). Valve (36) is controlled by the operator from control panel seen in FIG. 11. Electric bypass valve (36) is a bi-directional valve well known in the art, commercially available. In operation, it directs the solution to the injection nozzles for application. When it is desirable to discontinue application, its directs the solution back into tank (2).

The system also includes an emergency bypass valve (38) which is located between bypass valve (36) and manifold (35). In emergency situations, this valve is automatically activated to feed solution back into tank (2) through HPC hose (39), otherwise, it feeds the mixture to manifold (35) through HPC hose (34). Bypass valve (38) is a pressure sensitive valve, commercially available, and in the preferred embodiment it is set to "trip" at a pressure of 2400 psi such as to feed the mixture back into tank (2). This protects the spray components from excessive pressure. An in-line pressure gauge (33) is located in the line connection and displays the pressure (psi) in the high pressure system. The gauge is in clear view of the operator, (not seen), such that operator can be aware of the pressure at all times.

Further reference to FIG. 2 shows the shut-off valves for individual injector nozzle assemblies. HPC hoses (60), (70), (80), (90) have shut off valves (68), (78), (88), (98), respectively, between manifold (35) and individual hoses. These are manually operated.

Figure 3:
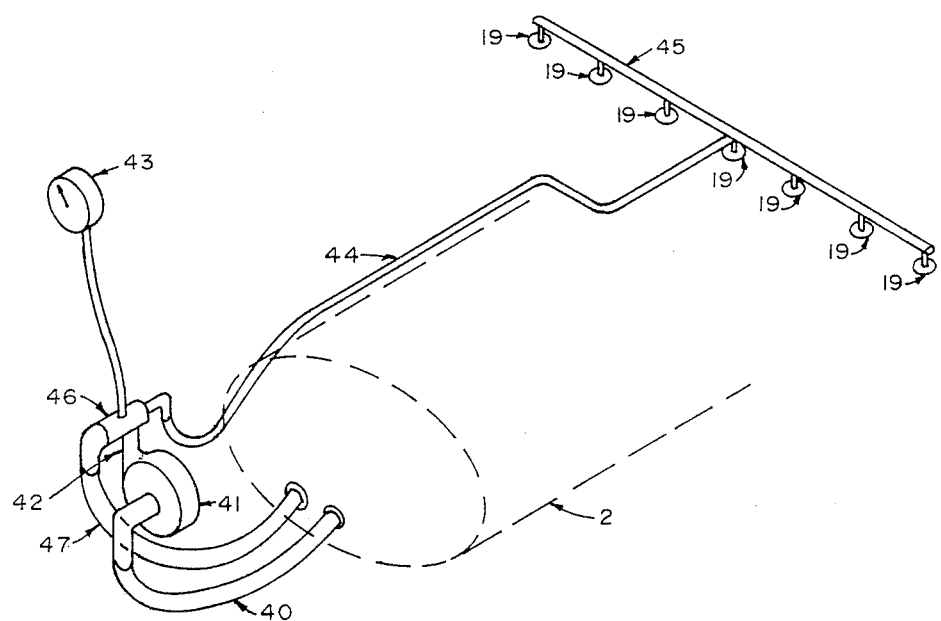
FIG. 3 is a schematic diagram of the plumbing for the low pressure broadcast system.

Reference to FIG. 3 shows a schematic diagram view of the plumbing of the low pressure broadcast spray system. Chemical hose (40) connects low pressure pump (41) to chemical tank (2). Pump (41) delivers the solution into chemical hose (42) which connects to in-line electric bypass valve (46), which further connects to spray boom (45) through chemical hose (44). Pressure in the low pressure system is in the range of 20–60 psi, suitable for broadcast spraying the surface of the soil. Boom (45) has a plurality of broadcast nozzles, generally designated (19).

Figure 4:
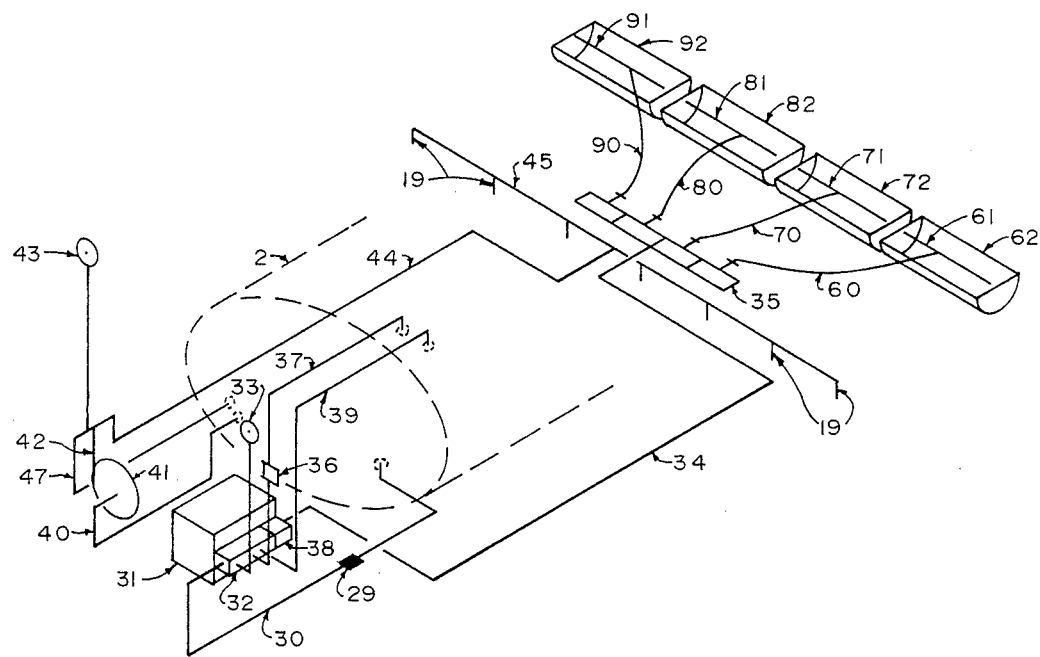
FIG. 4 is a schematic view of the high pressure injection system and low pressure system connected to the same tank.

Further reference to FIG. 3 shows a schematic view of the control systems for the low pressure system for broadcast spraying the surface of the soil. Centrifugal pump (41) feeds the solution under low pressure to in-line electric bypass valve (46) through chemical hose (42). In one position valve (46) directs the solution back to tank (2) through chemical hose (47), in the alternate it feeds the mixture to spray boom (45) through chemical hose (44). Valve (46) is controlled from control panel seen in FIG. 11. In-line pressure gauge (43) is located between pump (41) and boom (45), the gauge being in clear view of the operator displaying pressure in psi. FIG. 4 is a schematic diagram of the high pressure spray system and the low pressure spray system connected to tank (2). The two systems operate independently of each other having separate pumps to feed the system. The high pressure system is designed to inject solution into subsurface, the low pressure system is designed to broadcast spray the surface of the soil.

Figure 5:
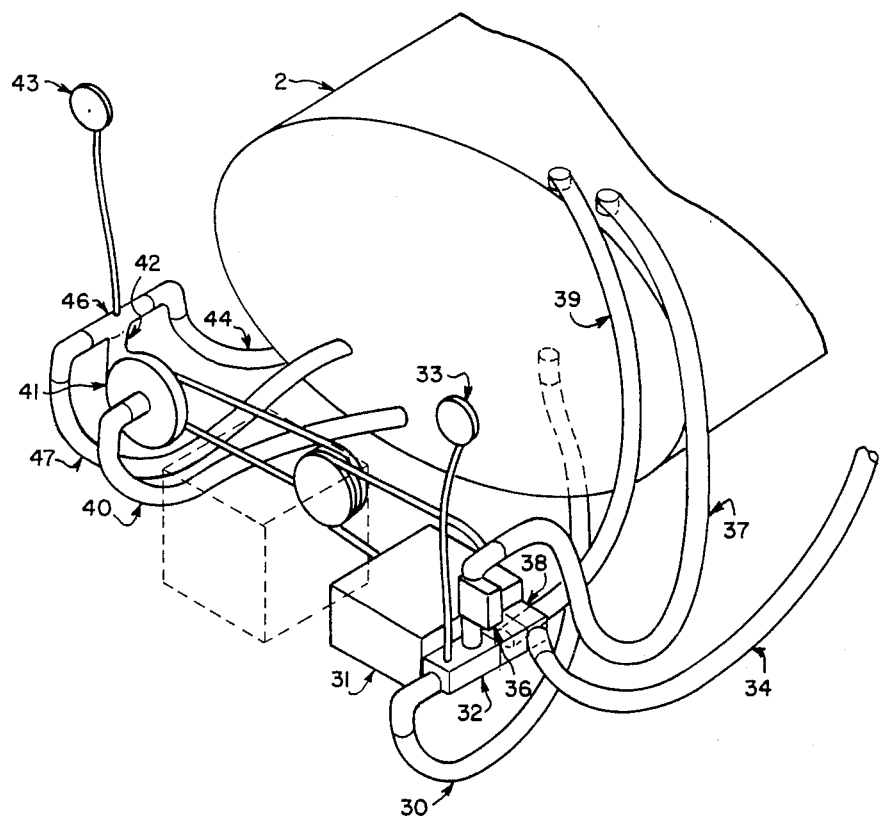
FIG. 5 is an expanded view of low pressure and high pressure pumps with connection to supply tank.

FIG. 5 is an expanded view of the low pressure centrifugal pump (41) and high pressure piston pump (31) with connections to supply tank (2). Pump (31) withdraws solution from supply tank (2) through hose (30) and delivers solution under pressure into hose (32). During operation, the solution passes through valve (36) and switch (38) into HPC hose (34) to manifold (35) for distribution to the injection nozzle assemblies.

Piston pump (31) technology is well known in the art, and there are available commercially models for this application. The present disclosure utilizes a pump capable of maintaining in-line pressures in the range of 1000–2200 pounds per square inch (psi). In-line pressure would be affected by pump output, the number of injection nozzles, and the tip size of the nozzles. Pump output would be affected by stroke volume and revolutions per minute (RPM) of the engine powering the pump. Application rate in gallons per acre (G.P.A.) would be further affected by ground speed of the spray (see Tables I and II). The present disclosure uses an adjustable stroke volume pump, commercially available. In operation, in-line pressure is regulated by adjusting stroke volume and engine RPM for a given nozzle tip size.

Further reference to FIG. 5 shows the low pressure sprayer system connection to tank (2). Low pressure pump (41) sucks solution from tank (2) through hose (40) and delivers it into hose (42) through valve (48) to hose (44) which connects to boom (45). The pressure in this system is maintained in the range of 20–60 psi. This disclosure uses a centrifugal pump, well known in the art and commercially available, powered by an internal combustion engine.

In the present disclosure, high pressure piston pump (31) and low pressure centrifugal pump (41) are powered by a common engine. In the preferred embodiment, the engine is a 30 horse power internal combustion engine with belt connections to the pumps. Other power means are possible. In an alternate embodiment, pump (31) and pump (41) could be powered by the power take-off drive of the vehicle towing the sprayer. In another alternate embodiment, centrifugal pump (41) could powered by an electrical engine, and piston pump (31) powered by an internal combustion engine.

Figure 6:
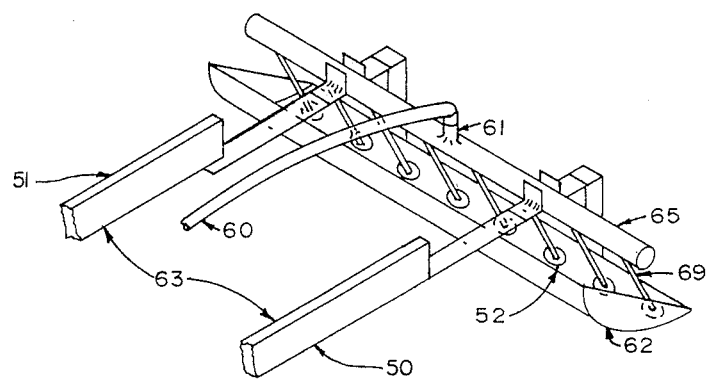
FIG. 6 is a top view of injection nozzle assembly positioned in injection shield pan.

The injector nozzle assembly, generally designated (61), is best seen in FIG. 6. It includes a header (65) and a plurality of injection nozzles generally designated (69). In this embodiment, there are seven injection nozzles, but there could be more or less in other embodiments. Header (65) is connected to manifold (35) by HPC hose (60) such that solution to be injected is delivered to nozzles (69). Nozzles (69) attachment to header (65) is designed such that nozzles are changeable having thread attachment. In practice, the operator of the spray system has available a number of injector nozzles with varying nozzle orifice diameters. For firm soil such as a clay type, a narrow orifice diameter injection nozzle is used in nozzle assembly (61) for penetrating power. For less firm soil such as the sandy types, a larger nozzle orifice diameter would be used for less penetrating power.

Further reference to FIG. 6 shows that nozzle assembly (61) is attached to frame, generally designed (63) by bolt attachment. Frame (63) includes two arm members (50) and (51). Frame (63) is further attached to injector shield pan assembly (62). Shield pan (62) is semicircular in cross-section being large at the top and rounded toward the bottom. This allows the shield pan to ride on the surface of soil of varying terrain. The shield pan assembly (62) has injection orifices, generally designated (52), drilled in bottom thereof, and the orifices are aligned with the injection nozzles such that the liquid jet passes through into this soil. The design of shield pan assembly (62) is an important feature of this invention. It allows the injection nozzles to be positioned close to the soil surface with a minimum of clogging, a problem that exists with other injection type devices.

Figure 7:
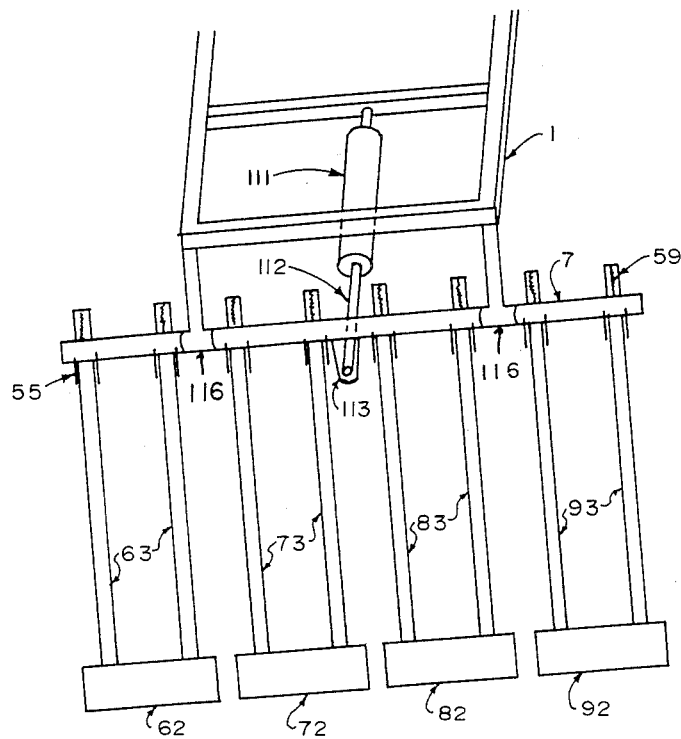
FIG. 7 is a top view of rotating boom with hydraulic lifting cylinder.

As seen in FIG. 7, the other end of frame (63) is attached to a rotatable bar (7) by a hinge mechanism. This design allows the shield pan assembly (62) to ride on the surface of soil of varying terrain during operation, and provides a method for raising the shield pan assembly off the ground when bar (7) is rotated about a transverse axis. Shield pans (72), (82), and (92) are likewise connected to rotatable bar (7) by floating frames (73), (83), and (93), respectively.

Figure 8:
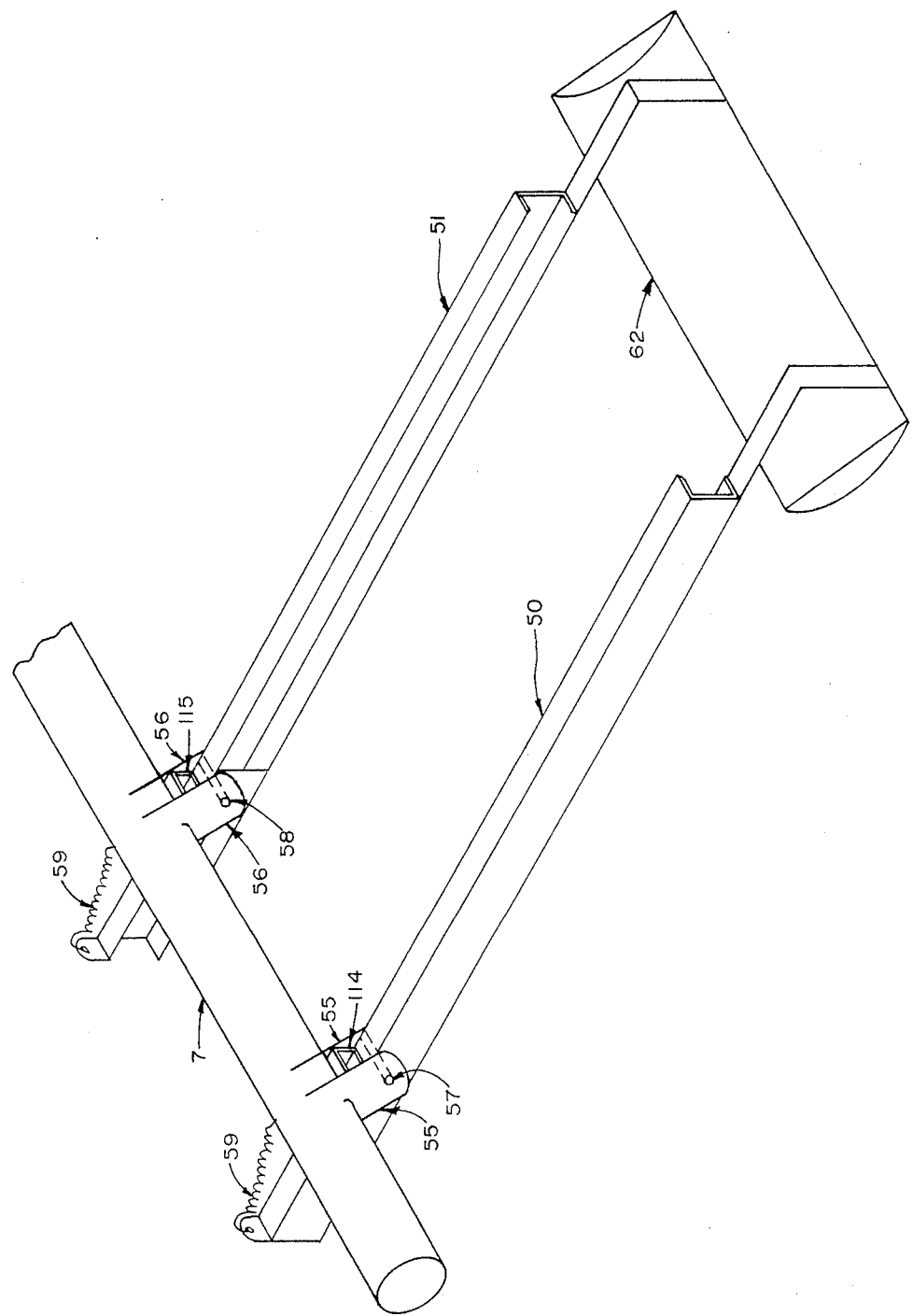
FIG. 8 is a sectional view of shield pan hinge connection.

FIG. 8 is an expanded view of the spring-loaded, hinge mechanism connecting shield pan assembly (62) to rotatable bar (7), which is used as an example of this connection in that other shield pans have identical connections. Rotatable bar (7) has dual plate members generally designated (55) and (56) securely attached to it. Arm member (50) passes between plate members (55), and is pivotally connected to plate members (55) by bolt connection (57). Arm member (51) passes through plate members (56), and is pivotally connected to plate members (56) by bolt connection (58). Bolt connections (57) and (58) allow frame (63) to ride up and down depending on the terrain. Tension springs, generally designated (59), are attached to distal ends of arm members (50) and (51), and further attached to rotatable bar (7). This arrangement has the affect of urging shield pan (62) in a downward direction against the ground, but allows the shield pan to follow the contour of the ground. When the contour causes the shield pan to rise up, the spring (59) allow this to occur, but causes tension in the spring urging the shield pan downward.

The shield pan assemblies (62), (72), (82), and (92) may be raised for turning at the end of the row or traveling, and lowered as at the beginning of application, by rotation of bar (7). As seen in FIG. 8, rotatable bar (7) has attached to it stop plates (114) and (115). Rotation of bar (7) causes the stop plates (114) and (115) to engage the distal ends of arms (50) and (51), forcing the distal end downward thus lifting the opposite end off the ground raising shield pan (62). Referring to FIG. 7, hydraulic cylinder (111) causes rotation of bar (7). Cylinder (111) is pivotally attached to one end to sprayer frame (1), and rod (112) extending from cylinder (111) is pivotally attached to arm (113) which is securely attached to bar (7). Hydraulic control is supplied in this embodiment by the tractor towing the sprayer. A flow of hydraulic fluid into cylinder (111) causes rod (112) to extend rotating bar (7) lifting the shield pans by the abovestated mechanism. Withdrawal of hydraulic fluid causes bar (7) to rotate in the opposite direction lowering the shield pans. Bar (7) rotates in sleeves generally designated (116) which are attached to frame (1).

Figure 9:
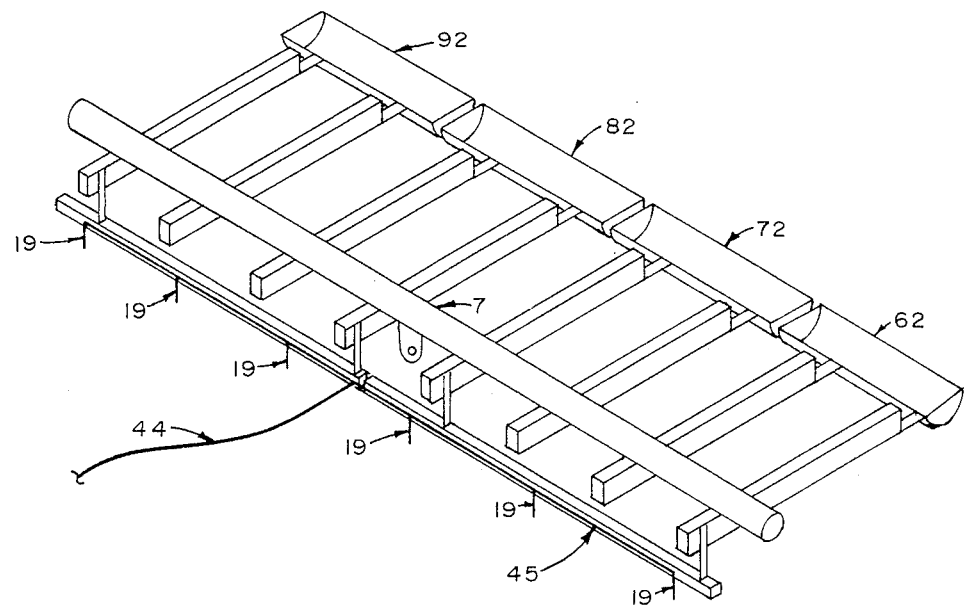
FIG. 9 is a fragmentary plain view of low pressure broadcast nozzles for surface application.

Referring to FIG. 9, there is shown a cut-away view of the low pressure spray system boom (45). Boom (45) is attached to frame (1), not shown. Hose (44) feeds solution to be sprayed from pump (41). Boom (45) has a plurality of broadcast nozzles generally designated (19), for broadcast spraying the surface of the soil. In this embodiment, there are six broadcast nozzles, but could be more or less in other embodiments. Boom (45) is positioned approximately twelve inches from the soil surface.

Figure 10:
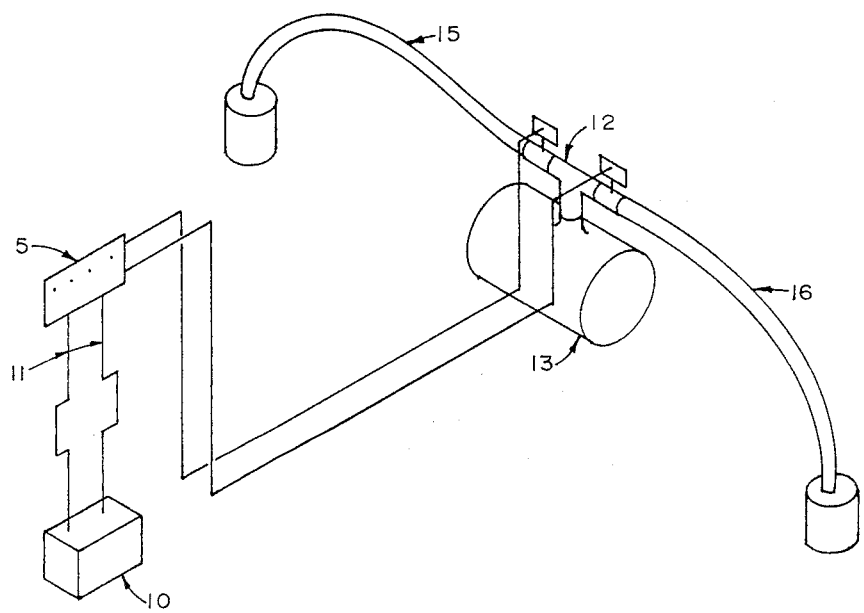
FIG. 10 is a schematic view of the foam marker.

Another feature of the sprayer is a foam marker, shown in FIG. 10. The foam marker, generally designated (12), is for the purpose of marking the injection path. Foam markers are well known in the art, and commercially available. In general, battery (10) is electrically connected by wire (11) to air compressor (13). When activated, compressor (13) causes foam to be formed which flows through either hose (15) and (16) to foam nozzle for discharge. Control of foam marker (12) is from control panel seen in FIG. 11.

Figure 11:
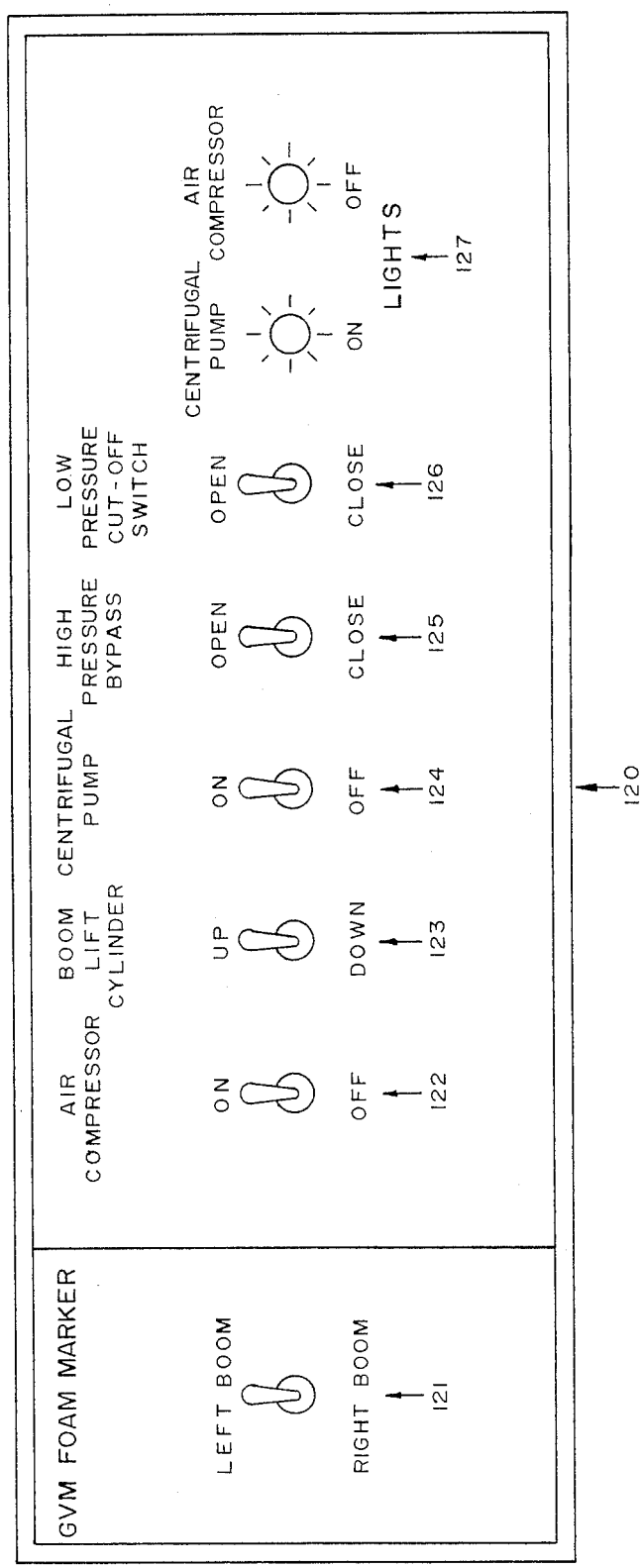
FIG. 11 is a schematic view of the control panel.

FIG. 11 is a schematic view of the control panel (120) for operation of the spray apparatus. The control panel is suitably located on the towing vehicle such that the operator can adjust all functions. Operating switches are indicated on FIG. 11, and include right-left foam marker (121), air compressor (122), boom lift hydraulic cylinder (123), centrifugal pump (124), high pressure bypass (125), and low pressure cutoff switch (126). The panel also contains indicator lights (127) for the centrifugal pump and air compressor.

Figure 12:
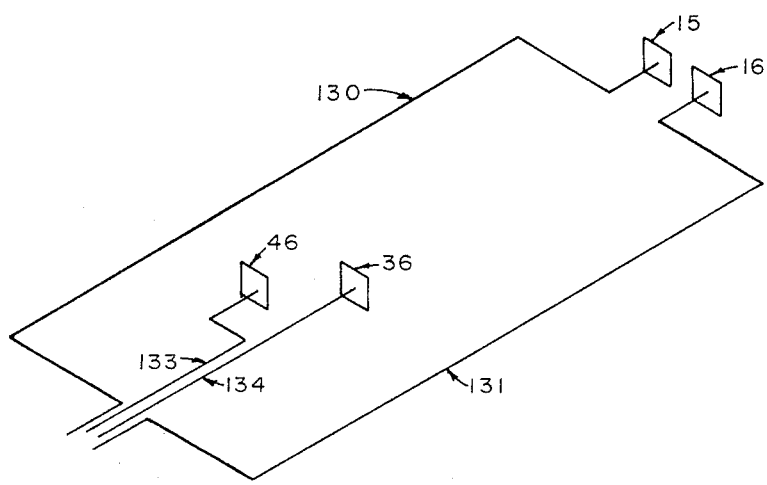
FIG. 12 is a schematic diagram of the electrical system.

FIG. 12 is a schematic diagram of the electrical connections from control panel (120) to components. Electrical connections (130) and (131) run to right foam marker (15) and left foam marker (16), respectively. Connection (133) runs to low pressure by-pass valve (46), and connection (134) runs to high pressure by-pass valve (36).

Table I shows typical characteristics of a spray system using the components of this invention described above. The chart reads in gallons per acre of chemical applied for the high pressure system based on a 3 inch nozzle spacing with nozzle tip size of 000021 HS. The pressure reading is from the in-line pressure gauge and is accomplished by adjusting the speed of engine powering the piston pump and stroke volume of the pump.

Table II shows application rate in gallons per acre based on 3 inch nozzle spacing with nozzle tip size of 000050 HSS.

Table III shows typical application rate of this invention for the low pressure spray system. The chart reads in gallons per acre based on 7 inch nozzle spacing with tip size of 8005. Pressure reading is from the in-line pressure gauge, and is varied by adjusting the speed of the centrifugal pump.

The above described invention relates a apparatus and method for continuous injection of agrochemicals in the subsurface of soil without tilling. While the invention has been described in the manner presently conceived to be most practical and preferred embodiment thereof, it will be apparent to persons ordinarily skilled in the art that modifications may be made thereof within the scope of the invention, which scope is to be accorded the broadest interpretation of the claims such as to encompass all equivalents, devices, and methods.

TABLE I

CHART READS IN GALLONS PER ACRE - BASED ON 3"
NOZZLE SPACING TIP SIZE: 000021 HSS

|  | 2 MPH | 2.5 MPH | 3 MPH | 3.5 MPH |
|---|---|---|---|---|
| 1600 P.S.I.* | 156.8 | 104.5 | 87.1 | 74.6 |
| 2000 P.S.I. | 175.8 | 117.2 | 97.6 | 83.7 |

*Pressure in pounds per square inch

TABLE II

CHART READS IN GALLONS PER ACRE - BASED ON 3"
NOZZLE SPACING TIP SIZE: 000050 HSS

|  | 2 MPH | 2.5 MPH | 3 MPH | 3.5 MPH | 4 MPH |
|---|---|---|---|---|---|
| 800 P.S.I.* | 261.3 | 174.2 | 145.2 | 124.4 | 108.9 |
| 1200 P.S.I. | 332.6 | 221.7 | 184.8 | 158.4 | 138.6 |
| 1600 P.S.I. | 380.1 | 253.4 | 211.2 | 181.0 | 158.4 |

*Pressure in pounds per square inch

TABLE III

CHART READS IN GALLONS PER ACRE - BASED ON 7"
NOZZLE SPACING TIP SIZE: 8005

|  | 2 MPH | 2.5 MPH | 3 MPH | 3.5 MPH |
|---|---|---|---|---|
| 20 P.S.I.* | 148.5 | 118.8 | 99.0 | 84.8 |
| 25 P.S.I. | 169.7 | 135.7 | 113.1 | 96.7 |
| 39 P.S.I. | 182.4 | 145.9 | 121.6 | 104.2 |

*Pressure in pounds per square inch

What is claimed is:

1. An apparatus for subsurface soil injection of agrochemicals utilizing a high pressure delivery system from a field sprayer vehicle, comprising:
   (a) a liquid holding tank for supplying an agrochemical solution to be injected, said tank supported by said vehicle;
   (b) a pump means, having hose connection to said tank, for receiving and delivering the solution into said high pressure delivery system within the range of 1000 to 2200 psi;
   (c) an engine means for powering said pump;
   (d) a distribution manfold, having hose connection to said pump, to receive and distribute the solution to injection nozzles;
   (e) multiple injection nozzles to form liquid jets of the solution being delivered at high pressure, said jets having sufficient velocity and narrow cross-section to inject into subsurface of soil;
   (f) an injection nozzle assembly for positioning said nozzles in a generally downward direction, said assembly including a header with hose connection to said manifold and having plurality of injection nozzles;
   (g) a shield pan, semicircular in cross-section, for riding on surface of soil causing said injection nozzles to be positioned close to soil surface without making contact, said shield pan having multiple spray injection orifices on bottom;
   (h) a support frame attached to top of said shield pan, said nozzle assembly being attached to said frame such that said injection nozzles are aligned with injection orifices, whereby said liquid jets pass through said injection orifices into soil; where
   (i) said frame is attached at one end to said vehicle and at the other end to said shield pan, said frame having a spring-hinge means to cause soil surface contact of said shield pan for varying terrain.

2. An apparatus as recited in claim 1, wherein: said pump is a piston pump.

3. An apparatus as recited in claim 2, wherein: said piston pump has means for varying output by adjusting stroke volume.

4. An apparatus as recited in claim 1, wherein: said engine is an internal combustion engine operating independently of engine moving the apparatus.

5. An apparatus as recited in claim 1, further comprising:
   a bypass value in said hose connection between said pump and said manifold, where in one position said valve feeds to said manifold, in alternate position said valve feeds to said tank.

6. An apparatus as recited in claim 1, further comprising:
   an emergency bypass valve in said hose connection between said pump and said manifold, where said emergency valve can be preset to trip at predetermined pressure.

7. An apparatus as recited in claim 1, further comprising:
   a shut-off valve between said manifold and said injection nozzle assembly.

8. An apparatus as recited in claim 1, further comprising:
   means of raising and lowering said shield pan utilizing rotatable bar, where in the raised position the nozzle are inoperative and suitable for turning, an in the lowered position the nozzles are operative for injecting solution into the soil.

9. An apparatus as recited in claim 8, further comprising:
a hydraulic cylinder means for rotating said bar.

10. An apparatus as recited in claim 8, further comprising:
means for diverting the solution back to said tank utilizing bypass valve while the nozzles are raised and in inoperative position.

11. The apparatus as defined in claim 1, further including:
(a) a rotatable bar connected to said vehicle, one end of said frame being connected to said bar and other end of said frame being connected to said shield pan, said nozzle injection assembly being carried by said shield pan; where
(b) said connection between said bar and said frame has spring-hinge means for allowing said shield pan to follow contour of the soil while at the same time urging the latter downward against the ground.

12. The apparatus as recited in claim 11, further comprising:
a lifting means connection between said bar and said frame whereby said frame can be raised by rotation of said bar to raise nozzle assembly to inoperative position utilizing stop plates attached to said bar.

13. An apparatus for mobile application of agrochemicals having two pressure systems, a low pressure system for broadcast spraying soil surface, and a high pressure system for subsurface injection, comprising:
(a) a liquid holding tank for supplying an agrochemical solution to be applied to the soil, said tank supported by a field sprayer vehicle;
(b) a high pressure pump having hose connection to said tank, for receiving and pressurizing the solution in said high pressure system within the range of 1000 to 2200 psi;
(c) a low pressure pump, having hose connection to said tank, for receiving and delivering the solution in said low pressure system within the range of 20 to 60 psi;
an engine means for powering said high pressure pump;
an engine means for powering said low pressure pump;
(f) a spray boom attached to said vehicle, having hose connection to said low pressure pump, said boom having multiple mist nozzles uniformly spaced for broadcast spraying soil surface transversely in the direction of vehicle movement;
(g) a distribution manifold, having hose connection to said high pressure pump to receive and distribute the solution to injection nozzles at high pressure;
(h) multiple injection nozzles to form liquid jets of the solution being delivered at high pressure, said jets having sufficient velocity and cross-section to inject into subsurface of soil;
(i) an injection nozzle assembly for positioning said nozzles in a generally downward direction, said assembly having hose connection to said manifold and having header with at least one nozzle;
(j) a shield pan, semicircular in cross-section, for riding on surface of soil causing said injection nozzles to be positioned close to soil surface without making contact, said shield pan having spray injection orifices on bottom in alignment with said liquid jets;
(k) a frame attached to said shield pan, said nozzle assembly being attached to said frame such that said liquid jets are aligned with said injection orifices, whereby said liquid jets pass through said injection orifices into soil, and
(l) a rotatable bar connected to said vehicle, one end of said frame being connected to said bar by spring-loaded connection means between said bar and said frame to urge the latter against the ground, other end of said frame being attached to said shield-pan assembly.

14. An apparatus as recited in claim 13, wherein:
said high pressure pump is a piston pump.

15. An apparatus as recited in claim 13, wherein:
said low pressure is a centrifugal pump.

16. An apparatus as recited in claim 13, wherein:
said engine means for powering said high pressure pump is an internal combustion engine operating independent of engine powering the moving vehicle.

17. An apparatus as recited in claim 13, further comprising:
bypass valve in connection between said low pressure pump and said spray boom, where in one position said valve feeds to said boom, in alternate position said valve feeds to said tank.

18. An apparatus as recited in claim 13, further comprising:
a bypass valve in connection between said high pressure pump and said manifold, where in one position said valve feeds to said manifold, and in alternate position said valve feeds to said tank.

19. An apparatus as recited in claim 13, further comprising:
means for allowing said shield pan assembly to follow contour of the ground while at the same urging said pan downward against the ground.

20. An apparatus as recited in claim 13, further comprising:
means for raising and lowering said shield pan utilizing said rotatable bar.

21. A method for applying agrochemicals from a liquid supply tank mounted on a moving field sprayer apparatus where a high pressure system injects the liquid into the soil, and a separate low pressure system broadcast the liquid onto the soil surface, comprising the steps of:
(1) attaching an adjustable-delivery-rate, high pressure pump to said tank by hose connection;
(2) causing said high pressure pump to withdraw the liquid from said tank and to deliver same into a high pressure delivery system at a pressure within the range of 1000 to 2200 psi;
(3) monitoring pressure in said high pressure system, and adjusting pump delivery rate such as to maintain a preselected pressure;
(4) feeding the pressurized liquid to a distribution manifold by a hose connection from said high pressure pump to said manifold;
(5) distributing the pressurized liquid from said manifold to multiple injection nozzles moving with the vehicle, nozzles being placed generally perpendicular and in close proximity to the soil, nozzle orifice being such as to cause liquid to form liquid jets with sufficient velocity and narrow cross-section to inject into subsurface of the
(6) attaching an adjustable-delivery-rate low pressure pump to said supply tank by hose connection;

(7) causing said low pressure pump to withdraw the liquid from said tank and to deliver same into a low pressure delivery system at a pressure within the range of 20 to 60 psi; and (8) feeding the liquid at low pressure to a broadcast boom having multiple mist nozzles uniformly spaced for broadcast spraying of soil surface transversely in the direction of vehicle movement.

22. A method as recited in claim 21, wherein:
pump delivery rate in step (3) is adjusted by varying stroke volume of said high pressure pump.

23. A method as recited in claim 21, wherein:
pump delivery rate in step (3) is adjusted by varying strokes per minute of said high pressure pump.

* * * * *